US008544237B2

(12) United States Patent
Zillmer et al.

(10) Patent No.: US 8,544,237 B2
(45) Date of Patent: Oct. 1, 2013

(54) LIFTING SYSTEM FOR SOLAR POWER TOWER COMPONENTS

(75) Inventors: Andrew J. Zillmer, Woodland Hills, CA (US); Daniel P. Cap, Chatsworth, CA (US)

(73) Assignee: Aerojet Rocketdyne of DE, Inc., Sacramento, CA (US)

( * ) Notice: Subject to any disclaimer, the term of this patent is extended or adjusted under 35 U.S.C. 154(b) by 1303 days.

(21) Appl. No.: 12/319,399

(22) Filed: Jan. 7, 2009

(65) Prior Publication Data
US 2010/0170188 A1 Jul. 8, 2010

(51) Int. Cl.
*E04H 12/34* (2006.01)
(52) U.S. Cl.
USPC ........... 52/745.17; 52/125.2; 52/119; 52/120; 52/122.1; 52/123.1
(58) Field of Classification Search
USPC ............... 52/111, 114, 119, 120, 121, 122.1, 52/123.1, 125.2, 125.3
See application file for complete search history.

(56) References Cited

U.S. PATENT DOCUMENTS

| | | | | | |
|---|---|---|---|---|---|
| 3,672,115 | A | * | 6/1972 | Abe et al. | 52/745.17 |
| 3,945,107 | A | * | 3/1976 | Houck | 29/431 |
| 4,356,498 | A | * | 10/1982 | Pollard | 343/890 |
| 4,470,739 | A | * | 9/1984 | Brewer et al. | 414/22.67 |
| 4,757,592 | A | * | 7/1988 | Reed | 29/429 |
| 5,182,458 | A | * | 1/1993 | McConachy | 290/55 |
| 5,247,776 | A | * | 9/1993 | Tamayo | 52/745.17 |
| 5,881,504 | A | * | 3/1999 | Wakisaka et al. | 52/125.2 |
| 5,980,190 | A | * | 11/1999 | Takeda | 414/609 |
| 6,357,549 | B1 | * | 3/2002 | Brennan et al. | 182/133 |
| 6,440,002 | B1 | * | 8/2002 | Jackson | 472/118 |
| 6,475,058 | B2 | * | 11/2002 | Mammano et al. | 446/426 |
| 6,522,025 | B2 | * | 2/2003 | Willis et al. | 290/55 |
| 6,888,264 | B1 | * | 5/2005 | Willis et al. | 290/55 |
| 7,168,522 | B1 | * | 1/2007 | Price | 182/141 |
| 7,218,013 | B2 | * | 5/2007 | Platt | 290/55 |
| 7,442,009 | B2 | * | 10/2008 | Arel | 416/142 |
| 7,666,103 | B2 | * | 2/2010 | Pondorfer et al. | 472/33 |
| 7,748,193 | B2 | * | 7/2010 | Knigge et al. | 52/651.1 |
| 8,011,098 | B2 | * | 9/2011 | Vorhies et al. | 29/889.2 |
| 8,069,634 | B2 | * | 12/2011 | Livingston et al. | 52/745.17 |
| 8,201,787 | B2 | * | 6/2012 | Ingram et al. | 248/218.4 |

(Continued)

FOREIGN PATENT DOCUMENTS

| | | |
|---|---|---|
| AU | 628569 B2 | 9/1992 |
| GB | 898187 A | 6/1962 |
| JP | 51079447 A | 7/1976 |
| WO | WO 0129366 A1 | 4/2001 |

OTHER PUBLICATIONS

Spanish Search Report and English Translation in related Spanish Application No. 20090235.0 filed Nov. 20, 2009.

*Primary Examiner* — William Gilbert
*Assistant Examiner* — Alp Akbasli
(74) *Attorney, Agent, or Firm* — Carlson, Gaskey & Olds, P.C.

(57) ABSTRACT

A lifting assembly for a solar power tower includes a track, a cable, and a winch. The track extends longitudinally from the tower top to the tower base. The winch is located at the tower top and anchors the cable that extends toward the tower bottom adjacent the track. A component attached to the track and to the cable is guided along the track by the winch spooling or unspooling the cable.

18 Claims, 4 Drawing Sheets

(56) References Cited

U.S. PATENT DOCUMENTS

| | | | |
|---|---|---|---|
| 2002/0128083 A1* | 9/2002 | Kleimeyer et al. | 472/131 |
| 2003/0033772 A1* | 2/2003 | Russell | 52/292 |
| 2003/0071468 A1* | 4/2003 | Platt | 290/55 |
| 2005/0193645 A1* | 9/2005 | Barnes | 52/120 |
| 2005/0239563 A1* | 10/2005 | Pondorfer et al. | 472/33 |
| 2007/0090653 A1* | 4/2007 | Martelon | 290/55 |
| 2008/0078128 A1* | 4/2008 | Livingston et al. | 52/40 |
| 2010/0044330 A1* | 2/2010 | Vorhies et al. | 212/175 |

* cited by examiner

LIFTING SYSTEM FOR SOLAR POWER TOWER COMPONENTS

CROSS-REFERENCE TO RELATED APPLICATION(S)

The present application is related to the following co-pending application filed on the same day as this application: "PRECISON OPTICAL ALIGNMENT MECHANISM FOR FIELD INSTALLATION OF HELIOSTATS" by inventor Joseph P. Carroll (U.S. patent application Ser. No. 12/319,393.

BACKGROUND

The present invention relates generally to solar power tower systems. More particularly, the present invention relates to a solar power tower system having an elevated central receiver.

Throughout the world there is an increasing demand for energy. Due to scarcity of resources and adverse environmental effects, alternatives to petroleum and coal based fuels are gaining popularity. As technology advances, the use of clean renewable energy sources to replace, or at least augment, conventional power plants is becoming feasible.

Solar power plants have proven effective and become the subject of global attention. In a typical arrangement, a centralized tower is located within a field of heliostats. The heliostats are tracking mirrors, which reflect sunlight to a solar receiver located on top of the tower. Within the receiver, the absorbed sunlight heats a fluid to high temperatures, thereby converting solar energy to thermal energy. The fluid containing the thermal energy is then sent down the tower to be stored or converted into electrical energy for use.

The solar receiver is often placed aloft in the central tower to increase the field of view such that many heliostats can focus sunlight onto the receiver. Tall central towers with solar receivers positioned 250 feet or more above ground are capable of harnessing a great amount of solar power. Although tall towers with lofty central receivers are desirable, advancements in technology that increase efficiency and reduce the cost of construction are needed.

SUMMARY

One embodiment of the present invention is a lifting assembly for a solar power tower. The solar power tower has a top and a base. A track extends longitudinally along a length of the tower between the top and the base. A cable is anchored at the top of the tower and extends toward the base of the tower adjacent to the track. A component is mounted on the track and connected to the cable. A winch is attached to the top of the tower and anchors the cable. The winch spools or unspools the cable to guide the component along the track.

Another embodiment of the present invention is a method of moving components up and down a solar power tower. The method includes attaching a component to a carriage mounted to a track extending longitudinally along the solar power tower and spooling or unspooling a cable having a first end connected to a top of the solar power tower and a second end connected to the carriage, such that the carriage supporting the component is guided along the track.

DETAILED DESCRIPTION

Figure 1:
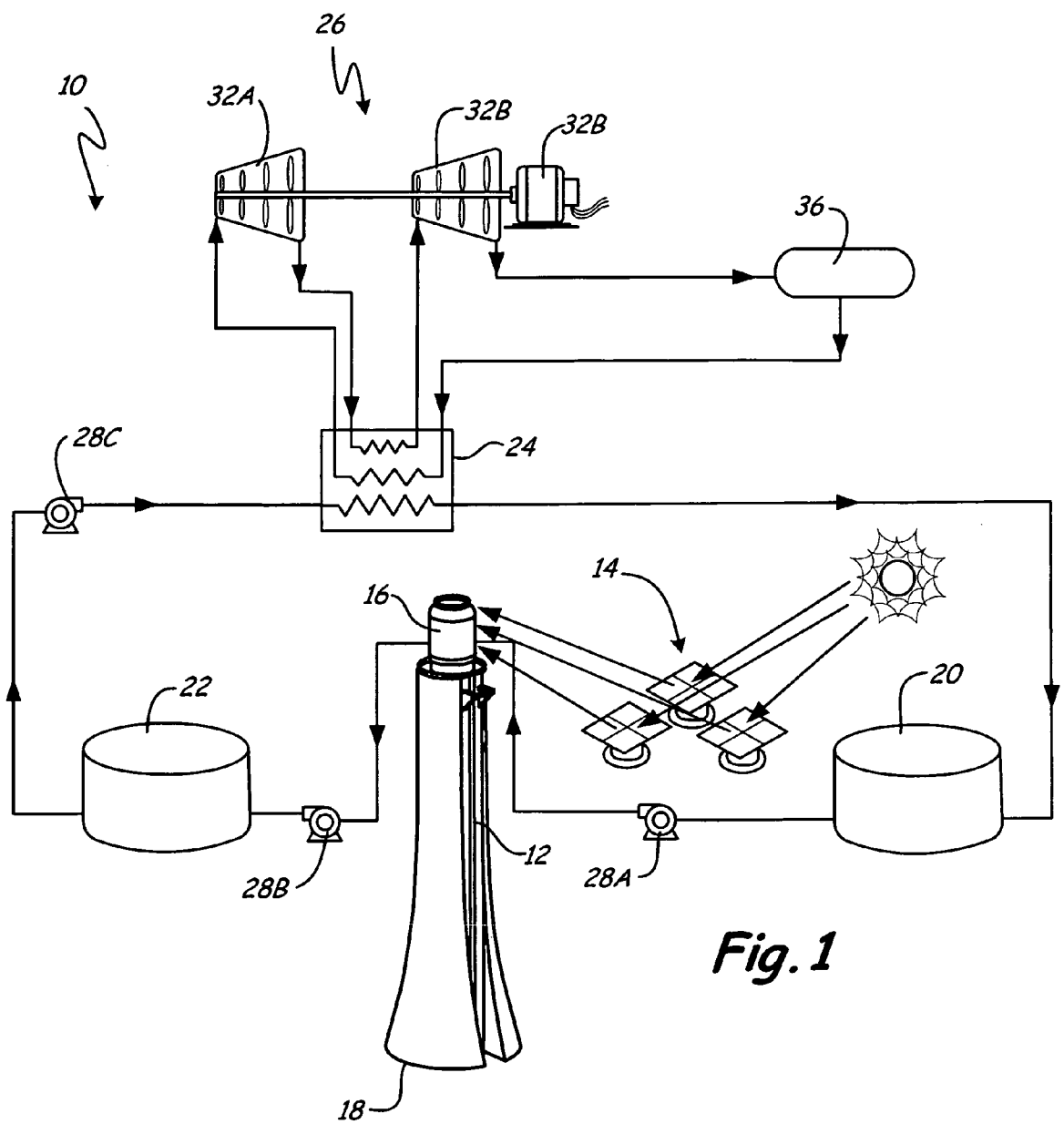
FIG. 1 is a diagram of a concentrated solar power generation system having a lifting system of the present invention.

FIG. 1 is a schematic diagram of concentrated solar power generation system 10 having lifting system 12 of the present invention. In the embodiment shown, system 10 comprises a power tower system having lifting system 12, solar collector system 14, central receiver 16, tower 18, cold storage tank 20, hot storage tank 22, heat exchanger 24, generator 26, and pumps 28A, 28B and 28C. Solar collector system 14 and central receiver 16 impart heat from the sun into a molten heat transfer medium contained in storage tanks 20 and 22 such that thermal energy can be converted to electrical energy using heat exchanger 24 and conversion system 26. Lifting system 12 transports tower components up tower 18 of solar power generation system 10.

Solar collector system 14 comprises an array of sun-tracking mirrors, or heliostats, that concentrate solar rays at central receiver 16 to heat a heat transfer medium. In one embodiment, approximately 8,500 heliostats, having surface areas of about 42 $m^2$ (square meters) to about 94 $m^2$, are arranged concentrically around a tower, having a height of approximately 170 meters, to cover an area of approximately 1 square mile (~2.59 square kilometers). The heat transfer medium typically comprises molten salt that is maintained in a molten state between approximately 500° F. (~260.0° C.) and 1200° F. (~648.9° C.) such that it remains liquid. Pump 28A directs cool heat transfer medium from cold storage tank 20 into a plurality of tubes within central receiver 16 whereby heat from the concentrated solar rays is imparted into the heat transfer medium. Pump 28B directs the heated heat transfer medium from receiver 16 to hot storage tank 22 where it is stored in a state ready for producing power with heat exchanger 24. When power is desired to be produced, heated heat transfer medium is routed by pump 28C from hot storage tank 22 to heat exchanger 24 where heat is input into conversion system 26. Conversion system 26 may comprise any conventional system that converts thermal energy to mechanical energy, such as Brayton cycle or Rankine cycle systems. In the embodiment shown, conversion system 26 comprises a steam turbine generator having first stage expander 32A, second stage expander 32B, generator 34 and condenser 36. Water within heat exchanger 24 is heated by the molten heat transfer medium to produce steam that turns first and second stage expanders 32A and 32B. Expanders 32A and 32B rotate a shaft to drive generator 34 to convert mechanical energy to electrical energy. Heat exchanger 24 therefore removes heat from the heat transfer medium before the heat transfer medium is returned to cold storage tank 20 through pipe 30D. The use of a heat transfer medium such as molten salt allows system 10 to efficiently store thermal energy in salt contained in hot storage tank 22 such that electrical power can be generated at times when solar collector system 14 is operating below peak. Thus, system 10 can be run 24 hours a day at low power production or at higher production levels for shorter intervals. Although solar power generation system 10 is shown using three pumps to move molten salt through pipes 30A-30D, more or fewer pumps can be used. For example, in various embodiments, the height of tower 18 provides enough pressure to move the molten salt into hot storage tank 22 such that pump 28B is not needed.

Although solar collector system 10 is desirable, construction of central receiver 16 atop tower 18 has proven difficult. Historically, cranes have been used to lift receiver components to the top of a solar power tower. With a crane, adverse weather conditions like high winds can cause construction delays and damage tower components. Specifically, if a crane and a cable are used to lift a component such as a receiver panel up a tower, then windy conditions can cause the receiver panel to collide with the tower resulting in damage to the receiver panel. Lifting system 12 can be included on tower 18 to decrease construction time due to weather delays and costs associated with damaged components. Use of lifting system 12 prevents components from colliding with tower, thereby allowing construction to proceed even in windy conditions.

Figure 2:
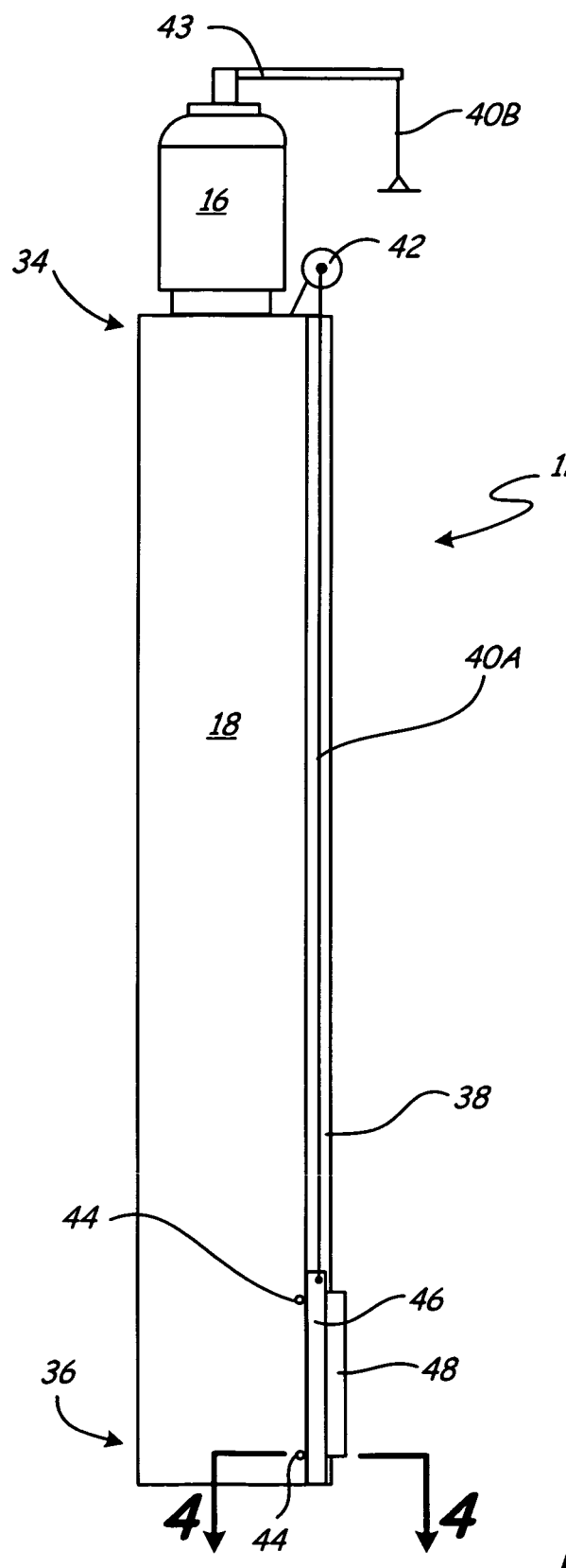
FIG. 2 is a side view of a tower having a lifting system.

FIG. 2 is a schematic side view of tower 18 having lifting system 12. Illustrated are lifting system 12, receiver 16, tower 18, tower top 34, tower bottom 36, track 38, cables 40A, 40B, winch 42, crane 43, wheels 44, carriage 46, and receiver panel 48. Lifting system 12 provides a means for safely moving tower components, such as receiver panel 48, up and down tower 18.

Lifting system 12 is located on a surface of tower 18. In the depicted embodiment, lifting system 12 is located on the exterior surface of tower 18, but in an alternative embodiment, lifting system 12 is located on the interior surface of tower 18. Receiver 16 is located on top 34 of and is supported by tower 18. Tower 18 is a large vertical structure having base or bottom 36 in contact with the ground and top 34 extending several hundred feet up in the sky. In one embodiment, tower 18 is about 300 feet tall and in an alternative embodiment, tower 18 is more than 600 feet tall. Track 38 is substantially linear and extends longitudinally along the outside surface of tower between top 34 and bottom 36. First cable 40A is affixed to top 34 and extends downwards toward bottom 36 adjacent to track 38. At top 34, first cable 40A is attached to winch 42. Winch 42 is attached to and supported by tower 18, at a location adjacent to receiver 16. Second cable 40B extends downwards adjacent winch 42 and receiver 16. Near top 34 and receiver 16, second cable 40B is attached to crane 43. Crane 43 is attached to and supported by receiver 16 in a location above winch 42. Attached to and capable of rolling along track 38 are wheels 44. In the depicted embodiment, two sets of wheels 44 are visible although more or fewer sets are contemplated. Carriage 46 is attached to at least one wheel and receiver panel 48 is removably, but securely attached to carriage 46.

Track 38 is configured to guide tower components, such as receiver panel 48, from base 36 to top 34 of tower 18. Equally possible is the use of track 38 to guide components from top 34 to base of tower 18. Thus, track 38 provides a stable lifting platform for the longitudinal movement of tower components regardless of adverse weather conditions. In use, a tower component is adequately secured to track 38 before traversing the vertical length of tower 18. In the depicted embodiment, carriage 46 supports and secures receiver panel 48 to track 38. A latch, fastener, or any other means of securing receiver panel 48 to carriage 46 can be used with system lifting system 12. Carriage 46 is attached to at least one wheel 44, a plurality of which are attached to track 38 and carry the load of receiver panel 48 while it uses track 38. Wheels 44 glide or roll along track 38 to keep carriage 46, and therefore receiver panel 48, on track 38.

Winch spools first cable 40A to initiate movement of carriage 46 up track 38. In alternative embodiments, winch 42 is a pulley, a crane, or any other suitable means for lifting. Winch 42 continues to spool, retract, or wind first cable 40A such that carriage 46 and attached receiver panel 48 move from bottom 36 to top 34 of tower 18. Once receiver panel 48 is near top 34 of tower, winch 42 stops lifting first cable 40A and movement of carriage 46 and attached receiver panel 48 ceases. In one embodiment, a friction brake is applied so that carriage 46 is held in place on track 38 near top 34. Second cable 40B is then attached to receiver panel 48 so that crane 43 can take control of receiver panel 48 movement. Once second cable 40B is secured to and supporting the load of receiver panel 48, the attachment between receiver panel 48 and carriage 46 is removed such that receiver panel 48 is now free from carriage 46. Crane 43 can then rotate receiver panel 48 three hundred sixty degrees around receiver 16 to place receiver panel 48 in a predetermined location on receiver 16. In alternative embodiments, crane 43 can be a winch, a pully, or any other means of lifting and rotating. Furthermore, crane 43 can be considered a placement device. Once receiver panel 48 is in a desired location it can be secured to the desired location and detached from second cable 40B and crane 43. Lifting system 12 allows for receiver panel 48 to be lifted to tower top 34 so that central receiver 16 can be constructed or repaired even in high winds.

Figure 3:
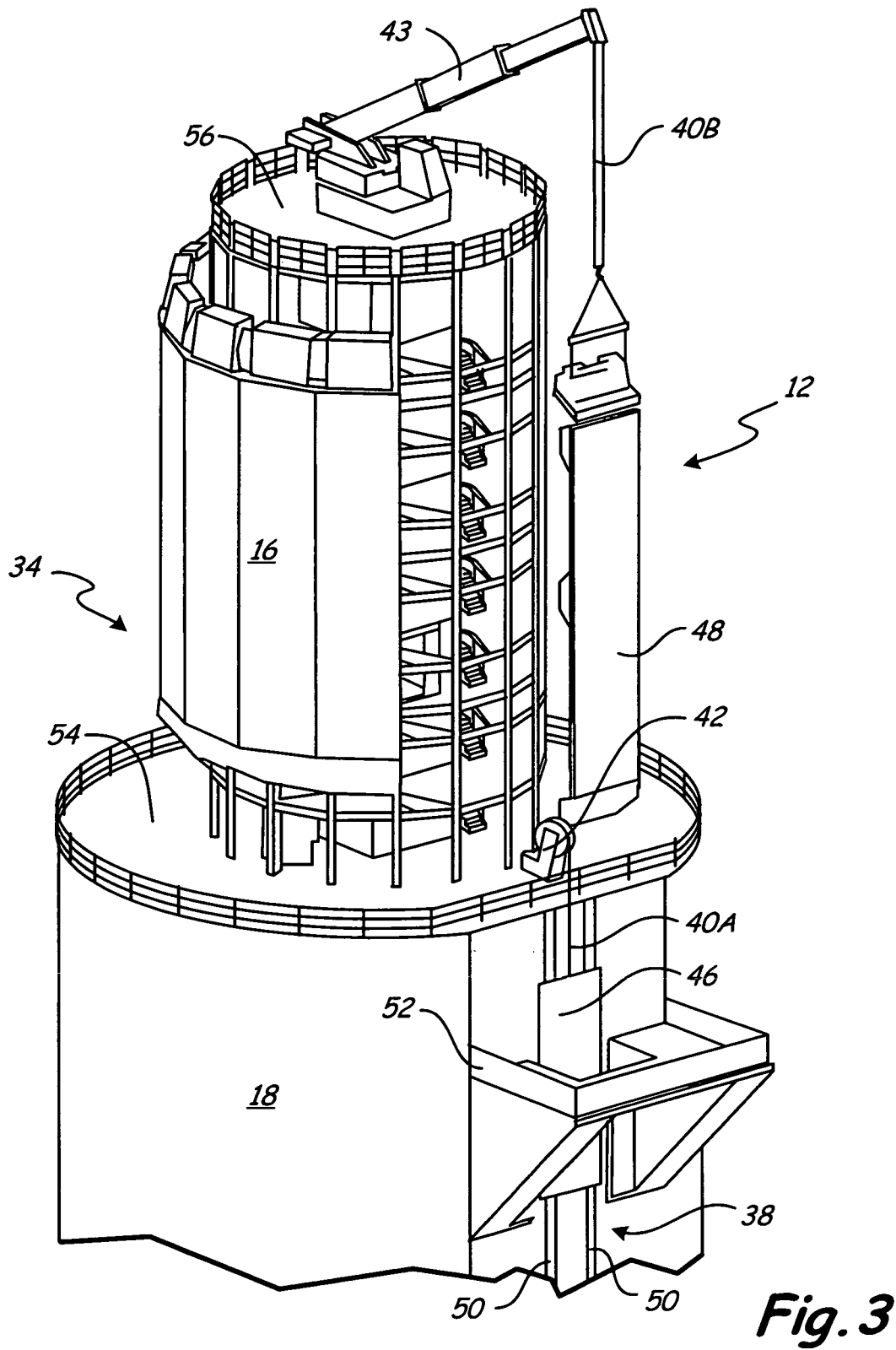
FIG. 3 is a perspective view of a tower top having a winch for lifting and a crane for use with the lifting system.

FIG. 3 is a schematic perspective view of tower top 34 having lifting system 12. Illustrated are lifting system 12, receiver 16, tower 18, track 38, cables 40A, 40B, winch 42, crane 43, carriage 46, receiver panel 48, rails 50, lower deck 52, receiver deck 54, and receiver top 56. Lifting system 12 having crane 43 allows for receiver panel 48 to be positioned on receiver 16.

Lifting system 12, receiver 16, tower 18, track 38, cables 40A, 40B, winch 42, crane 43, carriage 46, and receiver panel 48 are arranged as described above with reference to FIG. 2. In the depicted embodiment, track 38 includes two longitudinal and spaced apart bars or rails 50 that extend vertically up tower 18. An inside surface of bars 50 are adjacent tower 18 and an outside surface of rails 50 are adjacent carriage 46. Carriage 46 spans the distance between and is attached to both rails 50. Projecting from a side of tower 18, and surrounding a portion of track 38 near top 34, is lower deck 52. Receiver deck 54 is located above lower deck 50 and supports winch 42 as well as central receiver 16. Receiver top 56 is located above receiver deck 54 on top of receiver 16 and supports crane 56.

As described above, winch is used to lift receiver panel 48 up to a location near tower top 34. Two parallel rails 50 form track 38 for guiding carriage 46 and receiver panel 48 up tower 18. Once receiver panel 48 reaches a location near tower top 34, winch 42 stops pulling first cable 40A and therefore movement of carriage 46 and attached receiver panel 48 ceases. Lower deck 52 can be used to oversee and aid the transfer of receiver panel 48 from adaptor 46 to second cable 40B. In an alternative embodiment, where track 38 is internal to tower 18, lower deck 52 would also be located on the inside of tower 18. Once receiver panel 48 is secured to second cable 40B and detached from carriage 46, crane 43 is in control of receiver panel 48 movement. In the depicted embodiment, crane 43 lifts receiver panel 48 above receiver deck 54, which is essentially a staging area used for maintaining or servicing receiver 16. After reaching a predetermined height, crane 43 can rotate receiver panel 48 three hundred sixty degrees around receiver 16. Crane 43 functions as a receiver panel 48 placement device as it guides receiver panel 48 into a predetermined location on receiver 16. After being secured into place, receiver panel 48 is detached from second cable 40B and crane 43. Thus, lifting system 12 safely lifts and places receiver panel 48 on receiver 16 at tower top 34. Track 38 reduces any unwanted movement of receiver panel 48 as it traverses the length of tower 18.

Figure 4:
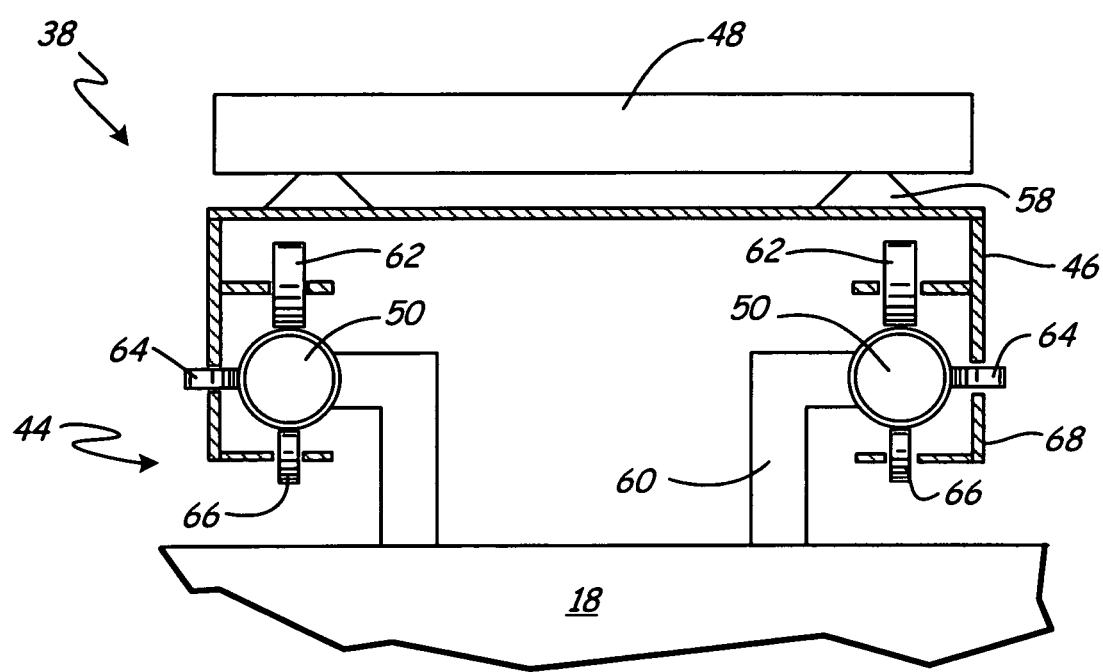
FIG. 4 is a cross section of a track and an carriage for use with the lifting system.

FIG. 4 is a schematic cross section of tower 18, track 38, wheels 44, carriage 46, and receiver panel 48. Illustrated are tower 18, track 38, wheels 44, carriage 46, receiver panel 48, rails 50, latch 58, bolts 60, road wheels 62, guide wheels 64, upstop wheels 66, and clamp 68. The relationship between track 38 and wheels 44 restricts unwanted movement of carriage 46 and receiver panel 48 as they traverse tower 18.

Receiver panel 48 is attached to carriage 46 by latch 58. In alternative embodiments, latch 58 can be a clip or a hook or any other suitable means of non-permanently, but securely fastening receiver panel 48 to carriage 46. The other side of carriage 46 is connected to at least one wheel 44 and clamp 68, which surrounds rail 50 and connects wheels 44 to one another. Wheels 44 are in contact with clamp 68 and rails 50 of track 38. Rails 50 are secured onto tower 18 by bolts 60. In alternative embodiments, bolts 60 can be pins or screws or any other suitable means of permanently fastening rails 50 to tower 18. In the depicted embodiment, wheels 44 are configured similarly to roller coaster wheels used in amusement parks. Wheels 44 come as sets, each set including three different types of wheels 44. More specifically, each set includes at least one road wheel 62, at least one guide wheel 64, and at least one upstop wheel 66. Road wheels 62 are located between carriage 46 and rail 50 such that they ride on an outside surface of rail 50. Guide wheels 64 are located on a side surface of rail 50 and can be located on either the internal or external side of track 38. Upstop wheels 66 are located between rail 50 and tower 18 such that they ride on an inside surface of rail 50. Thus, wheels 44, as well as connecting clamp 68, surround three sides of rail 50.

Wheels 44 are configured to allow vertical movement along track 38 but restrict movement away from track 38. Wheels 44 keep carriage 46, and therefore receiver component 48, securely on track 38. More specifically, wheels 44 are configured to restrict movement in the direction away from the rail 50 to which wheels 44 attach. Road wheels 62 carry the load of carriage 46 and receiver panel 48, as well as keep these components rolling on track 38. Guide wheels 64 prevent sideways movement of carriage 46 and receiver panel 48 away from track 38. Upstop wheels 66 further secure carriage 46 and receiver panel 48 to track 38 so that the components cannot "jump" track or fall off track 38. Wheels 44 secure carriage 46 and receiver panel 48 to rails 50 of track 38 such that movement in any direction besides vertical is prohibited.

Described above is a lifting system for use with a solar power tower. In the embodiment depicted, the lifting system extends vertically along an outside surface the tower. In an alternative embodiment, the entire lifting system is located within the tower. The lifting system uses a track, a cable, and a winch used together to guide a tower component from the tower base to the tower top. In one embodiment, the tower component is a receiver panel, which is transferred to a crane (also known as means for placement) at the tower top. The crane rotates the receiver panel into its predetermined location on the receiver. Once all the tower components, such as the central receiver, are assembled, the lifting system can be converted into a freight elevator. The carriage, which previously was used to secure receiver panels to the track, can be replaced by a cart or simply altered to carry equipment or humans up and down the in the same manner that the carriage once traversed the tower.

Although the present invention has been described with reference to preferred embodiments, workers skilled in the art will recognize that changes may be made in form and detail without departing from the spirit and scope of the invention.

The invention claimed is:

1. A method of moving components up and down a solar power tower, the method comprising:
    attaching a component to a carriage mounted on a track extending longitudinally along the solar power tower;
    spooling or unspooling a first cable such that the carriage supporting the component is guided along the track, the first cable having a first end and a second end, wherein:
        the first end is connected to a receiver deck attached to the top of the solar power tower; and
        the second end is connected to the carriage; and
    transferring the component from the carriage to a second cable at a lower deck that is positioned lower than the receiver deck, wherein the lower deck circumscribes a portion of the track.

2. The method of claim 1, further comprising:
    attaching the component to a placement device located on top of a central receiver attached to the top of the tower after spooling the cable.

3. The method of claim 2, further comprising:
    detaching the component from the carriage after attaching the component to the placement device.

4. The method of claim 3, further comprising:
    rotating the component around the central receiver into a predetermined location on the receiver.

5. The method of claim 4, further comprising:
    securing the component into the predetermined location on the receiver.

6. The method of claim 5, further comprising:
    detaching the component from the placement device.

7. The method of claim 1, wherein a winch spools or unspools the cable to guide the carriage along the track.

8. The method of claim 1, wherein the track has two longitudinal spaced apart rails for guiding the carriage along the track.

9. The method of claim 1, wherein the carriage comprises:
    a plurality of wheels attached to the rails for rolling along the rails, the wheels configured to allow vertical movement of the carriage along the track but restrict movement away from the track.

10. The method of claim 9, wherein the plurality of wheels are grouped into sets, each set comprising:
    road wheels located on an outside surface of the rails for carrying a load of the carriage;
    upstop wheels located on an inside surface of the rails for securing the carriage to the track; and
    guide wheels located on a side surface of the rails for preventing sideways movement of the carriage away from the track.

11. The method of claim 9, wherein the carriage is a cart configured to operate as a freight elevator longitudinally traversing the tower.

12. The method of claim 9, wherein the carriage is configured to support a receiver panel on the track.

13. The method of claim 12, wherein the carriage includes a latch for removably attaching the component.

14. The method of claim 13, wherein the component is a receiver panel for a solar power tower.

15. The method of claim 14, wherein:
    a field of heliostats surround the solar power tower.

16. The method of claim 15, wherein:
    a receiver deck is located on top of the tower, wherein a winch that spools or unspools the cable is attached to the receiver deck; and
    a central receiver is attached to the receiver deck.

17. The method of claim 16, wherein:
a crane is attached to the central receiver and located above the receiver deck, the crane configured to receive the component from the winch.

18. The method of claim 17, wherein the crane rotates the component 360 degrees around the central receiver to guide the receiver panel into a predetermined location on the central receiver.

* * * * *